Patented Feb. 14, 1928.

1,659,135

UNITED STATES PATENT OFFICE.

LEO P. CURTIN, OF FREEHOLD, NEW JERSEY, ASSIGNOR TO CURTIN-HOWE CORPORATION, A CORPORATION OF NEW YORK.

METHOD OF PRESERVING WOOD AND SOLUTIONS THEREFOR.

No Drawing.  Application filed May 15, 1926.  Serial No. 109,436.

In my copending application, Serial No. 39,391 filed June 24, 1925, I have disclosed and claimed a method of protecting vegetable substances from attack by insects, fungi, etc., and specifically a method for preserving wood, comprising treating the vegetable substance, or impregnating the wood, with an aqueous solution containing water-soluble components capable of reacting, on exposure to the atmosphere, to deposit a body of low solubility and high toxicity, the reaction being characterized by a progressive increase in the basicity of the solution. A typical example of this method as disclosed in the said application, involves dissolving cupric acetate and arsenous acid in equimolar proportions in water, preparing solutions of the order of 1% to 5% concentration with respect to the copper salt. This solution loses acetic acid upon exposure to the air, becoming progressively more basic and precipitating an aceto-arsenite of copper.

My further researches have shown that zinc meta-arsenite may be precipitated in similar manner in situ within the body of the wood; and that the precipitate so formed is a highly efficient preservative for the wood. The use of zinc in this process presents certain advantages over that of copper: notably in that zinc acetate has been found to be practically non-corrosive toward iron, so that the impregnation may be carried out either in open tanks or pressure vessels as may be desired. Cupric acetate on the contrary strongly attacks iron and steel.

The reaction involved may conveniently be assumed to be as follows:

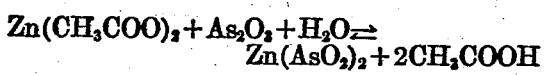

the zinc meta-arsenite depositing in solid phase as the original clear solution becomes progressively more basic owing to the loss of acetic acid by volatilization.

Analyses of the precipitate have indicated that it is in all probability largely at least a zinc salt of meta-arsenous acid, $HAsO_2$. Inasmuch as meta-arsenous acid is slightly stronger than ortho-arsenous acid, it was regarded as possible that its salts might prove to have low toxic value for the reason that they might not be dissolved by the weak acids arising out of the vital processes of the wood-rotting fungi. Direct experiment has however shown that this is not the case, and that zinc meta-arsenite is a strong toxic agent for these fungi, having approximately 50% higher toxicity than the ortho-arsenite and hence an excellent preservative for wood.

The salt is preferably applied in the form of a solution of about one to two percent concentration or less, a typical solution being prepared by dissolving in 98 parts by weight of water:

| | Parts. |
|---|---|
| Zinc chlorid $ZnCl_2$ | 0.972 |
| Calcium acetate $Ca(CH_3COO)_2.H_2O$ | 1.206 |
| Arsenic $As_2O_3$ | 1.400 |
| Acetic acid | .100 |

Zinc sulfate may be substituted for zinc chlorid. In formulæ containing both calcium-ion and sulfate-ion, the treating solution is first separated by decantation or filtration from any precipitate of calcium sulfate which may form. The function of the small amount of acetic acid is to prevent the light precipitation of toxic material which might occur prematurely in its absence, and to insure the precipitation of the meta-arsenite.

As heretofore stated, my invention is not limited to the use of the solutions for wood impregnation purposes. They may be employed for example for all insecticidal or fungicidal purposes, for which they possess certain advantages as compared with the usual aqueous suspensions of toxic compounds. These suspensions deposit toxic compounds over an area which is in general, less than the total area wetted by the liquid by which they are carried. My solutions on the contrary, when spread in the form of thin films upon foliage, undergo a relatively rapid decomposition or chemical change the result of which is to deposit the toxic body, such as zinc arsenite, over an area which is co-extensive with that wetted by the original solution. In other words, the distribution of a given weight of insoluble toxic body over a given area to be protected is more effectively performed with the hereindescribed clear solutions than with such suspensions as are commonly used for insecticidal and fungicidal purposes.

I claim:

1. Method of preserving wood comprising impregnating it with an aqueous solution containing water-soluble components capable of reacting, on exposure to the atmosphere, to deposit zinc meta-arsenite within the body of the wood.

2. Method of protecting vegetable substances from attack by insects, fungi, etc., comprising applying thereto an aqueous solution containing water-soluble components capable of reacting, on exposure to the atmosphere, and with progressive increase in basicity, to deposit a zinc-arsenic compound of low solubility and high toxicity.

3. Method of preserving wood comprising impregnating it with an aqueous solution containing water-soluble components capable of reacting, on exposure to the atmosphere, and with progressive increase in basicity, to deposit within the body of the wood a zinc-arsenic compound of low solubility and high toxicity.

4. Method of preserving wood comprising impregnating it with an aqueous solution containing water-soluble components capable of reacting, on exposure to the atmosphere, and with progressive increase in basicity, the deposit zinc meta-arsenite within the body of the wood.

5. An insecticidal and fungicidal solution comprising water-soluble components capable of reacting, on sufficient exposure to the atmosphere, to deposit zinc meta-arsenite.

6. An insecticidal and fungicidal solution comprising water-soluble components, including compounds of zinc and arsenic, capable of reacting on sufficient exposure to the atmosphere, and with progressive increase in basicity, to deposit a toxic zinc-arsenic compound of low solubility, said solution sufficiently stable to permit impregnation of wood therewith.

7. An insecticidal and fungicidal solution comprising water-soluble components capable of reacting, on sufficient exposure to the atmosphere, and with progressive increase in basicity, to deposit zinc meta-arsenite.

8. An article of wood impregnated with zinc meta-arsenite.

In testimony whereof, I affix my signature.

LEO P. CURTIN.